(12) United States Patent
Shin et al.

(10) Patent No.: US 11,084,338 B2
(45) Date of Patent: Aug. 10, 2021

(54) APPARATUS AND METHOD FOR MONITORING TIRE PRESSURE USING MASS OF VEHICLE

(71) Applicant: HYUNDAI AUTRON CO., LTD., Seongnam-si (KR)

(72) Inventors: Seung-Hwan Shin, Gwangmyeong-si (KR); Dong-Jin Na, Seongnam-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 316 days.

(21) Appl. No.: 15/209,485

(22) Filed: Jul. 13, 2016

(65) Prior Publication Data
US 2017/0015154 A1    Jan. 19, 2017

(30) Foreign Application Priority Data
Jul. 13, 2015   (KR) .................. 10-2015-0099113

(51) Int. Cl.
*B60C 23/06* (2006.01)
*G01G 19/12* (2006.01)

(52) U.S. Cl.
CPC .......... *B60C 23/061* (2013.01); *B60C 23/062* (2013.01); *G01G 19/12* (2013.01)

(58) Field of Classification Search
CPC ...... G01G 19/08; G01G 19/12; B60C 23/061; B60C 23/062; B60C 23/0474
See application file for complete search history.

(56) References Cited

U.S. PATENT DOCUMENTS

| | | | | |
|---|---|---|---|---|
| 2004/0017289 A1* | 1/2004 | Brown, Jr. | .......... | B60C 23/0408 340/442 |
| 2007/0139179 A1* | 6/2007 | Yanase | .................. | B60C 23/061 340/443 |
| 2008/0140276 A1* | 6/2008 | Griesser | .................. | G01L 17/00 701/33.8 |
| 2008/0281552 A1* | 11/2008 | Irth | ........................ | B60C 23/061 702/138 |
| 2010/0180677 A1* | 7/2010 | Katou | ..................... | B60C 23/04 73/146.3 |
| 2012/0245787 A1* | 9/2012 | Kawasaki | ............. | B60C 23/062 701/29.1 |

(Continued)

FOREIGN PATENT DOCUMENTS

| | | |
|---|---|---|
| DE | 10 2006 053 826 A1 | 6/2007 |
| EP | 3 100 877 A1 | 12/2016 |
| WO | 2005005173 A1 | 1/2005 |

OTHER PUBLICATIONS

Hong et al., A Novel Approach for Vehicle Inertial Parameter Identification Using a Dual Kalman Filter, IEEE Transactions on Intelligent Transportation Systems, vol. 16, No. 1, Feb. 2015, pp. 151-161. (Year: 2015).*

(Continued)

*Primary Examiner* — Catherine T. Rastovski
*Assistant Examiner* — Liam R Casey
(74) *Attorney, Agent, or Firm* — Baker & Hostetler LLP; Hyunho Park

(57) ABSTRACT

The present invention relates to an apparatus for monitoring a tire pressure using a mass of a vehicle. Provided is a tire pressure monitoring apparatus using a mass of a vehicle including: a radius analyzing unit; a frequency analyzing unit; a mass estimating unit; a calibration unit; and a low pressure determining unit.

17 Claims, 3 Drawing Sheets

(56) References Cited

U.S. PATENT DOCUMENTS

2014/0172251 A1* 6/2014 Championnet ....... B60C 23/062
  701/51
2015/0298513 A1* 10/2015 Taki ..................... B60C 23/061
  73/146.2

OTHER PUBLICATIONS

Zhang et al., Design of Tire Pressure Monitoring System Based on Resonance Frequency Method, 2009 IEEE/ASME International Conference on Advanced Intelligent Mechatronics, Singapore, Jul. 2009. (Year: 2009).*

* cited by examiner

APPARATUS AND METHOD FOR MONITORING TIRE PRESSURE USING MASS OF VEHICLE

CROSS-REFERENCE TO RELATED APPLICATIONS

This application claims priority to and the benefit of Korean Patent Application No. 10-2015-0099113 filed in the Korean Intellectual Property Office on Jul. 13, 2015, the entire contents of which are incorporated herein by reference.

TECHNICAL FIELD

The present invention relates to an apparatus and a method for monitoring a tire pressure, and more particularly, to an apparatus and a method for monitoring a tire pressure which may more precisely determine a low pressure of a tire using a mass of a vehicle.

BACKGROUND ART

Air pressure of a tire is one of the elements that allow a vehicle to safely travel. When the air pressure of the tire is low, a vehicle easily slides which may result in a big accident. Further, fuel consumption is increased, so that fuel efficiency is lowered. Further, the life-span of the tire is shortened and ride comfort and braking force significantly deteriorate. When the air pressure of the tire decreases, functional problems including deterioration of fuel efficiency, tire wear, and the like may occur. In addition, when the decrease in air pressure is significant, there is a possibility that vehicle damage and danger to human life such as an accident occurrence caused by a driving inoperability state or tire rupture will occur.

However, since most drivers cannot recognize a change in air pressure of the tire, a tire pressure monitoring system (TPMS) which is a tire pressure monitoring system announcing the change in pressure of the tire to the drivers in real time has been developed.

In recent years, the tire pressure monitoring system (TPMS) is mounted on a vehicle, which detects the decrease in air pressure of the tire mounted on the vehicle and announces the detected decrease in air pressure to the driver.

The tire pressure monitoring system (TPMS) announces the decrease in pressure of the tire to the driver to allow the driver to check a pressure state of the tire, thereby solving the problem.

The TPMS may be generally classified into a direct scheme and an indirect scheme.

The direct scheme of TPMS installs a pressure sensor in a tire wheel to directly measure the air pressure of the tire. The direct scheme of TPMS announces the change in air pressure of the tire, which is measured from the pressure sensor attached to the tire to the driver.

The direct scheme of TPMS may accurately sense the air pressure of the tire, but the life-span of a battery is limited and whenever the tire is replaced, the direct scheme of TPMS needs to be installed again. In the direct scheme of TPMS, since a pressure sensor is attached, imbalance of the tire may occur and problems including radio frequency interference and the like may occur. Further, since the direct scheme of TPMS is a scheme that mounts the sensor on the tire to measure the air pressure, the indirect scheme of TPMS has an advantage in that the direct scheme of TPMS measure accurate pressure. On the contrary, the direct scheme of TPMS is constituted by various components including a pressure measurement sensor mounted on the tire, a wireless communication unit for transmitting a measurement value in a general wireless scheme, and the like. Therefore, the direct scheme of TPMS is more expensive and further, higher in failure rate than the indirect scheme of TPMS.

Meanwhile, the indirect scheme of tire pressure monitoring system is a scheme that estimates a loss in air pressure by using a wheel velocity sensor which is mounted on the vehicle to measure a wheel velocity. In the indirect scheme of TPMS, since the TPMS may be implemented only by an algorithm, additional hardware is not required, which results in reduced cost. Further, only minor maintenance cost is consumed. The indirect scheme of TPMS has higher better competitiveness than the direct scheme of TPMS.

The indirect scheme of TPMS indirectly estimates the change of the air pressure of the tire through change of a response characteristic (for example, a rotation velocity or a frequency characteristic of the rotation velocity) of the tire generated when the air pressure is lowered and announces the estimation to the driver. The direct scheme of TPMS may precisely detect the lowering of the air pressure of the tire, but an exclusive wheel is required therefor and performance is not good in an actual environment. Therefore, it has disadvantages in view of a technology and cost.

However, since the resonance frequency of the indirect scheme of TPMS varies depending on the wheel velocity, accuracy of the indirect scheme of TPMS slightly deteriorates. Since the estimated change in air pressure of the tire may be different from an actual change, the indirect scheme TPMS may send a false alarm to the driver.

The indirect scheme of TPMS estimates an air pressure of a tire from rotation information of the tire. The indirect scheme of TPMS may be, in detail, classified into a dynamic loaded radius (DLR) analysis scheme and a resonance frequency method (RFM) analysis scheme again. They may be briefly called a radius analysis scheme and a frequency analysis scheme. They may be briefly called a radius analysis scheme and a frequency analysis scheme.

In a frequency analysis scheme, when the air pressure of the tire decreases, a difference from a tire having a normal air pressure is detected by using that a frequency characteristic of a rotational velocity signal of a wheel is changed. In the frequency analysis scheme, based on a resonance frequency which may be acquired by frequency analysis of the rotational velocity signal of the wheel, when the relevant resonance frequency is calculated to be lower than a reference frequency estimated while initializing, it is determined that the air pressure of the tire decreases.

In a radius analysis scheme, by using a phenomenon in which a dynamic loaded radius of the depressurized tire decreases while driving, and as a result, the tire rotates more rapidly than the normal tire, the pressure decrease is detected by comparing rotational velocities of four tires. In the radius analysis scheme of the tire pressure monitoring system, since it is determined whether the tire is depressurized based on a wheel velocity, the wheel velocity exerts a largest influence on the determination of the depressurization.

In the meantime, when a low pressure of a tire is estimated using a dynamic radius analysis technique, a value estimated using the dynamic radius analysis technique may be affected depending on a mass of the vehicle. However, the indirect scheme of TPMS does not consider the influence of the dynamic radius analysis value in accordance with the mass of the vehicle. Since the change in air pressure of the tire estimated by the dynamic radius analysis technique may be different from an actual change, the indirect scheme of TPMS may send a false alarm to the driver.

Therefore, a technique which more precisely monitors a tire pressure and determines a low pressure of the tire by correcting a dynamic radius analysis value in accordance with the change of the mass of the vehicle is demanded.

SUMMARY OF THE INVENTION

The present invention has been made in an effort to provide an apparatus and a method for monitoring a tire pressure using a mass of a vehicle which estimates an added mass of the vehicle and corrects a radius analysis value in accordance with reliability of the estimated added mass of the vehicle to compensate the influence of the radius analysis value in accordance with the mass of the vehicle.

The present invention has been made in an effort to further provide an apparatus and a method for monitoring a tire pressure which precisely determine a low pressure of a tire mounted on a vehicle using a radius analysis value corrected in accordance with reliability of an added mass of the vehicle.

An aspect of the present invention provides a tire pressure monitoring apparatus using a mass of a vehicle. The apparatus includes: a radius analyzing unit which calculates a radius analysis value using a relative velocity difference and an average velocity calculated from wheel velocities of the wheels mounted on the vehicle; a frequency analyzing unit which measures frequency data for every wheel and calculates a frequency low pressure probability for determining a low pressure for every wheel using the measured frequency data; a mass estimating unit which estimates an added mass of the vehicle and calculates reliability of the estimated added mass of the vehicle; a calibration unit which calculates a mass compensation value using a calculated added mass of the vehicle and a predetermined mass coefficient, calculates a frequency correction coefficient using the calculated frequency low pressure probability, and corrects the calculated radius analysis value using the calculated mass compensation value and frequency correction coefficient in accordance with the calculated reliability of the added mass; and a low pressure determining unit which determines a low pressure of a tire mounted on a vehicle using the corrected radius analysis value.

The apparatus may further include a data storing unit in which data related with radius analysis and frequency analysis used to determine the low pressure of the tire mounted on the vehicle and a predetermined mass coefficient for every tire of the vehicle are stored.

When the reliability of the added mass of the vehicle is calculated using a Kalman filter, the mass estimating unit may calculate reliability of the calculated added mass of the vehicle using a covariance of the Kalman filter.

The calibration unit may calculate a mass compensation value by multiplying the predetermined mass coefficient and a value obtained by dividing a value which is obtained by subtracting a minimum mass from the added mass of the vehicle by a mass difference of the maximum and minimum masses.

The calibration unit may calculate a relative low pressure probability between a front wheel and a rear wheel from a frequency low pressure probability for the low pressure for every vehicle and an average low pressure probability and calculate the frequency correction coefficient using the calculated relative low pressure probability and average low pressure probability.

When the reliability of the added mass of the vehicle is equal to or smaller than a predetermined value, the calibration unit may correct the front and rear radius analysis value DEL_FR using the calculated frequency correction coefficient and the mass coefficient and when the reliability of the added mass of the vehicle exceeds the predetermined value, the calibration unit may correct the front and rear radius analysis value DEL_FR using the calculated mass compensation value.

When the reliability of the added mass of the vehicle is equal to or smaller than the predetermined value, the calibration unit may correct the calculated front and rear radius analysis value DEL_FR by subtracting a value obtained by multiplying the calculated frequency correction coefficient and the mass coefficient from the calculated front and rear radius analysis value DEL_FR.

When the reliability of the added mass of the vehicle exceeds the predetermined value, the calibration unit may correct the calculated front and rear radius analysis value DEL_FR by subtracting the calculated mass compensation value from the calculated front and rear radius analysis value DEL_FR.

The low pressure determining unit may determine a low pressure of the tire by combining the left and right radius analysis value and a diagonal radius analysis value, among the radius analysis values calculated in the radius analyzing unit and the front and rear radius analysis value corrected in the calibration unit.

A second aspect of the present invention provides a tire pressure monitoring method using a mass of a vehicle. The method includes calculating a radius analysis value using a relative velocity difference and an average velocity calculated from wheel velocities of the wheels mounted on the vehicle; measuring frequency data for every wheel and calculating a frequency low pressure probability for determining a low pressure for every wheel using the measured frequency data; estimating an added mass of the vehicle and calculating reliability of the estimated added mass of the vehicle; calculating a mass compensation value using a calculated added mass of the vehicle and a predetermined mass coefficient, calculating a frequency correction coefficient using the calculated frequency low pressure probability, and correcting the calculated radius analysis value using the calculated mass compensation value and frequency correction coefficient in accordance with the calculated reliability of the added mass; and determining a low pressure of the tire mounted on the vehicle using the corrected radius analysis value.

In the calculating of reliability of the added mass, when the reliability of the added mass of the vehicle is calculated using a Kalman filter, the reliability of the calculated added mass of the vehicle may be calculated using a covariance of the Kalman filter.

In the correcting of a radius analysis value, a mass compensation value may be calculated by multiplying the predetermined mass coefficient and a value obtained by dividing a value which is obtained by subtracting a minimum mass from the added mass of the vehicle by a mass difference of the maximum and minimum masses.

In the correcting of a radius analysis value, a relative low pressure probability and an average low pressure probability between a front wheel and a rear wheel may be calculated from a frequency low pressure probability for the low pressure for every vehicle and a frequency correction coefficient may be calculated using the calculated relative low pressure probability and average low pressure probability.

In the correcting of a radius analysis value, when the reliability of the added mass of the vehicle is equal to or smaller than a predetermined value, the front and rear radius analysis value DEL_FR may be corrected using the calculated frequency correction coefficient and a mass coefficient and when the reliability of the added mass of the vehicle exceeds the predetermined value, the front and rear radius analysis value DEL_FR may be corrected using the calculated mass compensation value.

In the correcting of a radius analysis value, when the reliability of the added mass of the vehicle is equal to or smaller than the predetermined value, the calculated front and rear radius analysis value DEL_FR may be corrected by subtracting a value obtained by multiplying the calculated frequency correction coefficient and the mass coefficient from the calculated front and rear radius analysis value DEL_FR.

In the correcting of a radius analysis value, when the reliability of the added mass of the vehicle exceeds the predetermined value, the calculated front and rear radius analysis value DEL_FR may be corrected by subtracting the calculated mass compensation value from the calculated front and rear radius analysis value DEL_FR.

In the determining of a low pressure of the tire, a low pressure of the tire may be determined by combining the left and right radius analysis value and a diagonal radius analysis value, among the calculated radius analysis values and the corrected front and rear radius analysis value.

According to the exemplary embodiments of the present invention, an added mass of the vehicle is estimated and the radius analysis value is corrected in accordance with reliability of the estimated added mass of the vehicle, to compensate an influence of the radius analysis value in accordance with the mass of the vehicle.

According to the exemplary embodiments of the present invention, it is possible to precisely determine a low pressure of the tire mounted on the vehicle using a radius analysis value corrected in accordance with the reliability of the added mass of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
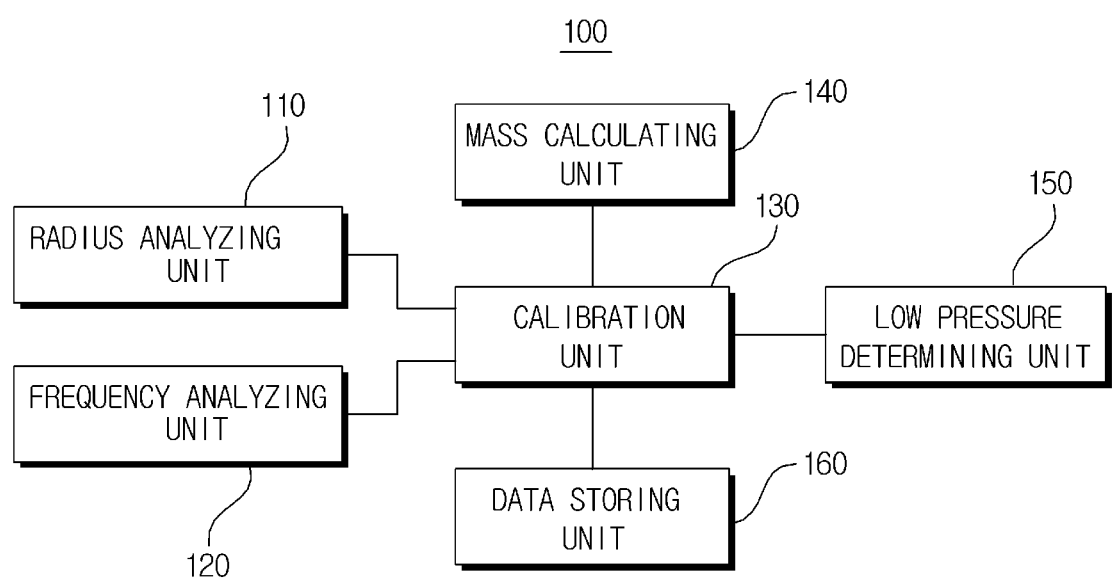
FIG. 1 is a configuration view of a tire pressure monitoring apparatus using a mass of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

When the exemplary embodiment is described, a technology which is well known in the technical field of the present invention and is not directly related with the present invention will not be described. The reason is that unnecessary description is omitted to clearly transmit the gist of the present invention without obscuring the gist.

By the same reason, in the accompanying drawings, some parts are exaggerated, omitted, or schematically illustrated. Further, an actual size is not fully reflected to the size of each component. In the drawings, like reference numerals denote like or corresponding components.

FIG. 1 is a configuration view of a tire pressure monitoring apparatus using a mass of a vehicle according to an exemplary embodiment of the present invention.

As illustrated in FIG. 1, a tire pressure monitoring apparatus 100 according to an exemplary embodiment of the present invention includes a radius analyzing unit 110, a frequency analyzing unit 120, a calibration unit 130, a mass estimating unit 140, a low pressure determining unit 150, and a data storing unit 160.

Hereinafter, specific configuration and operation of components of a tire pressure monitoring apparatus 100 using a mass of a vehicle of FIG. 1 will be described.

First, the radius analyzing unit 110 receives a wheel velocity of a wheel from a wheel velocity sensor (not illustrated) provided in the vehicle. In the vehicle, four wheels including a front left wheel FL, a front right wheel FR, a rear left wheel RL, and a rear right RR wheel are mounted. The wheel velocity sensor detects rotation velocities of the front left wheel FL, the front right wheel FR, the rear left wheel RL, and the rear right wheel RR. For example, the wheel velocity sensor may be a wheel velocity sensor which generates a rotation pulse using an electromagnetic pickup and measures a rotational angular velocity and a wheel velocity from a pulse number. In the meantime, the wheel velocity sensor may be an angular velocity sensor. Information on the rotation velocity of the wheel measured by the wheel velocity sensor is transmitted to the radius analyzing unit 110.

The radius analyzing unit 110 calculates a radius analysis value using a relative velocity difference and an average velocity calculated from wheel velocities of the wheels mounted on the vehicle. Here, the radius analysis is performed by determining whether a pressure of the tire is reduced by comparing the rotation velocities of the wheel. Therefore, the radius analysis may be performed by comparing the rotation velocities of the wheels using various methods. In this exemplary embodiment, the radius analysis value is calculated by the following method.

When it is assumed that wheel rotation velocities are $V_{\Phi A}$, $V_{\Phi P}$, $V_{PA}$, and $V_{PP}$ for the front left wheel FL, the front right wheel FR, the rear left wheel RL, and the rear right wheel RR, the average velocity $V_M$ of four wheels is calculated by the following Equation 1.

$$V_M = \frac{(V_{FL} + V_{FR} + V_{RL} + V_{RR})}{4} \quad \text{Equation 1}$$

Here, $V_{ΦΛ}$, $V_{ΦP}$, $V_{PΛ}$, and $V_{PP}$ represent wheel velocities of the front left wheel FL, the front right wheel FR, the rear left wheel RL, and the rear right wheel RR, respectively, and $V_M$ represents an average velocity of four wheels.

The radius analyzing unit 110 calculates the radius analysis values DEL_FR, DEL_LR, and DEL_DIAG, as represented in following Equations 2 to 4, using the wheel velocities $V_{ΦΛ}$, $V_{ΦP}$, $V_{PΛ}$, and $V_{PP}$ of the front left wheel FL, the front right wheel FR, the rear left wheel RL, and the rear right wheel RR and the average velocity $V_M$ of four wheels.

$$DEL\_FR = \frac{\frac{V_{FL}+V_{FR}}{2} - \frac{V_{RL}+V_{RR}}{2}}{V_M} \qquad \text{Equation 2}$$

Here, DEL_FR is a radius analysis value of the front and rear wheels, $V_{XX}$ is a wheel velocity of XX wheel, and $V_M$ is an average velocity of four wheels.

$$DEL\_LR = \frac{\frac{V_{FL}+V_{RL}}{2} - \frac{V_{FR}+V_{RR}}{2}}{V_M} \qquad \text{Equation 3}$$

Here, DEL_LR is a radius analysis value of the left and right wheels, $V_{XX}$ is a wheel velocity of XX wheel, and $V_M$ is an average velocity of four wheels.

$$DEL\_DIAG = \frac{\frac{V_{FL}+V_{RR}}{2} - \frac{V_{FR}+V_{RL}}{2}}{V_M} \qquad \text{Equation 4}$$

Here, DEL_DIAG is a radius analysis value of the wheels in a diagonal direction, $V_{XX}$ is a wheel velocity of XX wheel, and $V_M$ is an average velocity of four wheels.

The frequency analyzing unit 120 measures frequency data for every wheel mounted on a vehicle. The frequency data is measured from a plurality of tires mounted on the vehicle. In this case, a frequency of a tire measured when the driver excessively steers a handle or excessively puts a brake pedal or an accelerator pedal may be excluded. Here, the frequency may be a resonance frequency generated in accordance with a wheel velocity of the tire.

The frequency analyzing unit 120 calculates a frequency probability for determining a low pressure for every wheel using the measured frequency data. Here, the frequency probability may be a frequency low pressure probability for determining a low pressure of the front left wheel FL, the front right wheel FR, the rear left wheel RL, and the rear right wheel RR.

The mass estimating unit 140 estimates an added mass of the vehicle. The mass estimating unit 140 may calculate a currently added mass of the vehicle using a mass estimating logic as represented in Equation 5.

Added Mass=Estimated Mass−Mass of Empty Vehicle   Equation 5

Here, the mass of the empty vehicle indicates a mass of only the vehicle without having a passenger or goods. The estimated mass indicates a mass of the vehicle which is estimated by the mass estimating unit when a passenger or goods are loaded on the vehicle.

As another example, the mass estimating unit 140 may calculate an added mass of the vehicle using a vehicle mass map stored in the data storing unit 160. The data storing unit 160 may store a wheel velocity difference map for every vehicle velocity in which a vehicle velocity is mapped to a wheel velocity difference between a front wheel and a rear wheel of the vehicle, in accordance with a vehicle tire characteristic. Further, the data storing unit 160 may store a mass map for every vehicle torque or every yaw rate in which the torque or the yaw rate and the wheel velocity difference are mapped to a vehicle mass. That is, the data storing unit 160 may store detailed information on driving information of the vehicle, in advance.

The mass estimating unit 130 calculates reliability of the estimated added mass of the vehicle. When the reliability of the added mass of the vehicle is calculated using a Kalman filter, the mass estimating unit 130 may calculate the reliability of the calculated added mass of the vehicle which is calculated using a covariance of the Kalman filter.

In the meantime, the calibration unit 130 calculates a mass compensation value using the added mass of the vehicle calculated in the mass estimating unit 140 and a predetermined mass coefficient. Here, the predetermined mass coefficient is stored in the data storing unit 160.

The calibration unit 130 calculates the mass compensation value by multiplying the predetermined mass coefficient and a value obtained by dividing a value which is obtained by subtracting a minimum mass from the added mass of the vehicle by a mass difference of the maximum and minimum masses as represented in the following Equation 6.

$$\text{Mass compensation value} = \frac{(\text{added mass} - \text{minimum mass})}{(\text{maximum mass} - \text{minimum mass})} \times \text{mass coefficient} \qquad \text{Equation 6}$$

The calibration unit 130 calculates a frequency correction coefficient using a frequency low pressure probability calculated in the frequency analyzing unit 120.

The calibration unit 130 calculates a relative low pressure probability between a front wheel and a rear wheel from a frequency low pressure probability for the low pressure for every vehicle and an average low pressure probability. Further, the calibration unit 130 may calculate the frequency correction coefficient using the calculated relative low pressure probability and average low pressure probability as represented in Equation 7.

$$\text{Frequency correction coefficient} = \frac{\left[\left(\begin{array}{l}FL \text{ low pressure probability}+\\ FR \text{ low pressure probability}\end{array}\right)/2 - \left(\begin{array}{l}RL \text{ low pressure probability}+\\ RR \text{ low pressure probability}\end{array}\right)/2\right]}{\left[\left(\begin{array}{l}FL \text{ low pressure probability}+\\ FR \text{ low pressure probability}+\\ RL \text{ low pressure probability}+\\ RR \text{ low pressure probability}\end{array}\right)/4\right]} \qquad \text{Equation 7}$$

Here, the FL low pressure probability, the FR low pressure probability, the RL low pressure probability, and the RR low pressure probability represent a probability in which the front left wheel FL, the front right wheel FR, the rear left wheel RL, and the rear right wheel RR are determined to be low pressure. Further, the frequency correction coefficient is smaller than 0 (<0), the frequency correction coefficient=−(frequency correction coefficient).

Thereafter, the calibration unit 130 corrects the radius analysis value calculated in the radius analyzing unit 110 using the calculated mass compensation value and the frequency correction coefficient in accordance with the reliability of the added mass calculated in the mass estimating unit 140. The calibration unit 130 corrects the radius analysis value calculated in the radius analyzing unit 110 using the frequency low pressure probability for determining a low pressure for every wheel calculated in the frequency analyzing unit 120 and the reliability of the added mass of the vehicle calculated in the mass estimating unit 140.

When the reliability of the added mass of the vehicle is equal to or smaller than a predetermined value, the calibration unit 130 corrects the front and rear radius analysis value DEL_FR using the calculated frequency correction coefficient and the mass coefficient. In contrast, when the reliability of the added mass of the vehicle exceeds the predetermined value, the calibration unit 130 corrects the front and rear radius analysis value DEL_FR using the calculated mass compensation value.

A case when the reliability of the added mass of the vehicle is equal to or smaller than the predetermined value or a case when the reliability of the added mass of the vehicle exceeds the predetermined value will be described below.

When the reliability of the added mass of the vehicle is equal to or smaller than the predetermined value, the calibration unit 130 may correct the front and rear radius analysis value DEL_FR calculated in the radius analyzing unit 110 by subtracting a value obtained by multiplying the calculated frequency correction coefficient and the mass coefficient from the front and rear radius analysis value DEL_FR calculated in the radius analyzing unit 110, as represented in the following Equation 8. That is, when the reliability of the added mass of the vehicle is equal to or smaller than the predetermined value, the calibration unit 130 may calculate a correction value of the front and rear radius analysis value DEL_FR by subtracting a value obtained by multiplying the frequency correction coefficient and the mass coefficient from the front and rear radius analysis value DEL_FR, as represented in the following Equation 8.

$$DEL\_FR \text{ correction value} = DEL\_FR - \text{Frequency correction coefficient} \times \text{Mass coefficient} \quad \text{Equation 8}$$

Here, DEL-FR is a radius analysis value of front and rear wheels, and the DEL_FR correction value is a corrected front and rear radius analysis value DEL_FR, that is, a correction value of the front and rear radius analysis value DEL_FR.

In contrast, when the reliability of the added mass of the vehicle exceeds the predetermined value, the calibration unit 130 may correct the calculated front and rear radius analysis value DEL_FR by subtracting the mass compensation value calculated in the mass estimating unit 140 from the front and rear radius analysis value DEL_FR calculated in the radius analyzing unit 110, as represented in the following Equation 9. That is, when the reliability of the added mass of the vehicle exceeds the predetermined value, the calibration unit 130 may calculate a correction value of the front and rear radius analysis value DEL_FR by subtracting the mass compensation value from the front and rear radius analysis value DEL_FR, as represented in the following Equation 9.

$$DEL\_FR \text{ correction value} = DEL\_FR - \text{Mass compensation value} \quad \text{Equation 9}$$

Here, DEL-FR is a radius analysis value of front and rear wheels, and the DEL_FR correction value is a corrected front and rear radius analysis value DEL_FR, that is, a correction value of the front and rear radius analysis value DEL_FR.

As described above, the calibration unit 130 analyzes correlation of the front and rear radius analysis value DEL_FR and the added mass of the vehicle to correct a precise radius analysis value by considering how much the added mass of the vehicle affects the radius analysis value of the front and rear wheels when the vehicle is being driven.

For example, when the reliability of the added mass calculated in the mass estimating unit 140 is equal to or smaller than the predetermined value, the calibration unit 130 corrects the radius analysis value by considering a frequency analysis technique together with the influence on the added mass. That is, the calibration unit 130 may correct the radius analysis value using not only the mass coefficient but also the frequency correction coefficient.

As another example, when the reliability of the added mass calculated in the mass estimating unit 140 exceeds the predetermined value, the calibration unit 130 may correct the radius analysis value only by considering the influence on the added mass, without considering the frequency analysis technique in the correction of the radius analysis value. That is, the calibration unit 130 may correct the radius analysis value only using the mass compensation value.

The low pressure determining unit 150 determines the low pressure of the tire mounted on the vehicle using the radius analysis value corrected in the calibration unit 130. The low pressure determining unit 150 may determine a low pressure of the tire by combining the left and right radius analysis value and a diagonal radius analysis value, among the radius analysis values calculated in the radius analyzing unit 110 and the front and rear radius analysis value corrected in the calibration unit 130.

In the meantime, the data storing unit 160 stores data relating determining the low pressure of the tire mounted on the vehicle, a radius analysis value, and data for analyzing a frequency. Further, the data storing unit 160 stores a predetermined mass coefficient for every tire of the vehicle.

Figure 2:
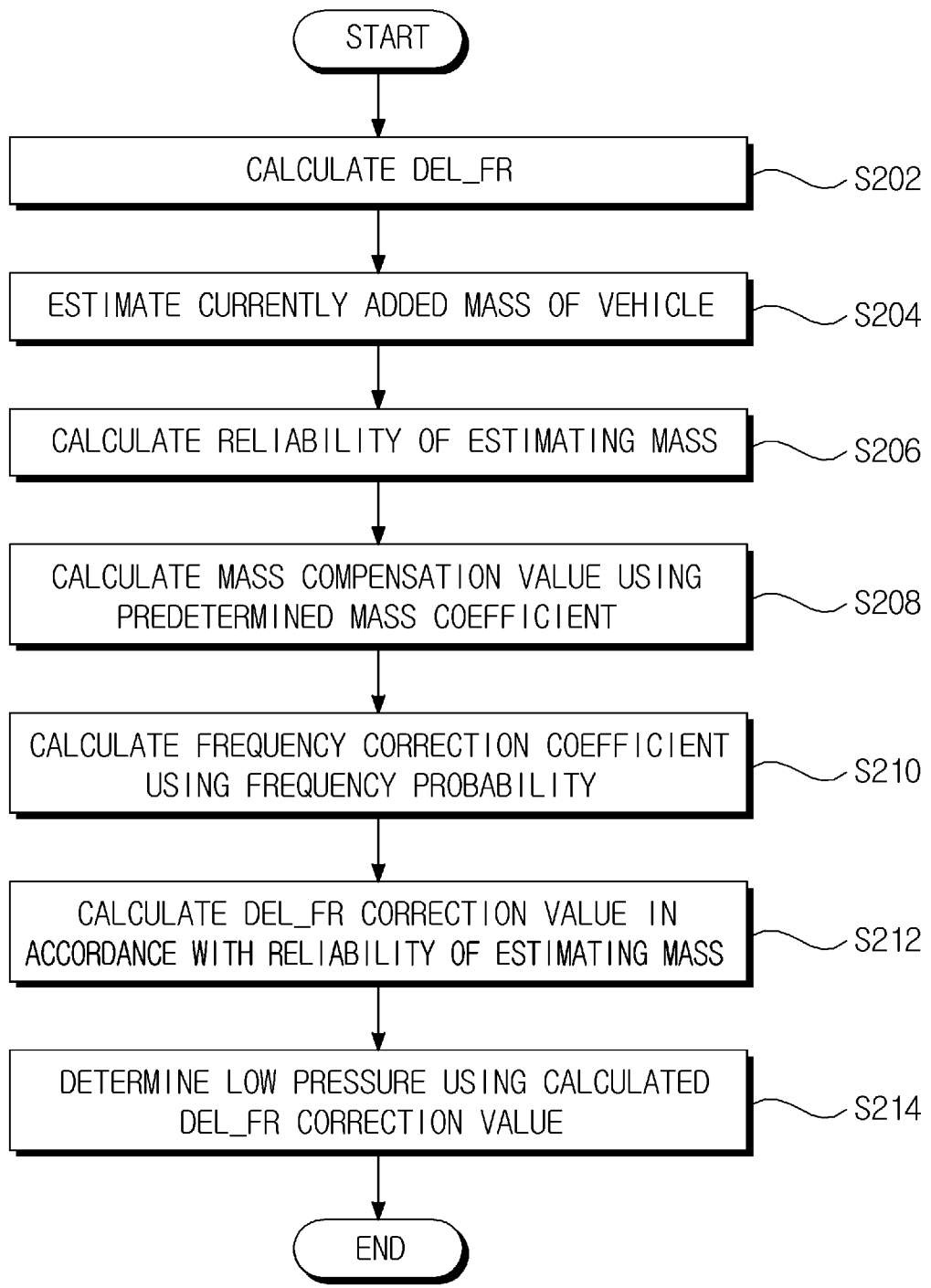
FIG. 2 is a flow chart of a tire pressure monitoring method using a mass of a vehicle according to an exemplary embodiment of the present invention.

FIG. 2 is a flow chart of a tire pressure monitoring method using a mass of a vehicle according to an exemplary embodiment of the present invention.

The radius analyzing unit 110 calculates a front and rear radius analysis value DEL_FR using a relative velocity difference and an average velocity calculated from wheel velocities of the wheels mounted on the vehicle in step S202. Here, when a reset button for calibration of the monitoring of a tire pressure is input from a user, the radius analyzing unit 110 may calculate a front and rear radius analysis value DEL_FR.

The mass estimating unit 140 estimates a currently added mass of the vehicle in step S204. That is, the mass estimating unit 140 may estimate the currently added mass of the vehicle using a mass estimating logic.

The mass estimating unit 130 calculates reliability of the estimated added mass of the vehicle in step S206. Here, the mass estimating unit 130 may calculate the reliability of the calculated added mass using a covariance of the Kalman filter.

The calibration unit 130 calculates a mass compensation value using the added mass of the vehicle calculated in the mass estimating unit 140 and a predetermined mass coefficient in step S208.

Next, the calibration unit 130 calculates a frequency correction coefficient using a frequency low pressure probability calculated in the frequency analyzing unit 120 in step S210.

Thereafter, the calibration unit 130 calculates the DEL_FR correction value in accordance with reliability of estimating a mass in step S212. That is, the calibration unit 130 corrects the radius analysis value calculated in the radius analyzing unit 110 using the calculated mass compensation value and the frequency correction coefficient in accordance with the reliability of the added mass calculated in the mass estimating unit 140.

The low pressure determining unit 150 determines the low pressure of the tire mounted on the vehicle using the front and rear radius analysis value DEL_FR corrected in the calibration unit 130 in step S214. Here, the low pressure determining unit 150 may determine a low pressure of the tire by combining the left and right radius analysis value and a diagonal radius analysis value, among the radius analysis values calculated in the radius analyzing unit 110 and the front and rear radius analysis value corrected in the calibration unit 130.

Figure 3:
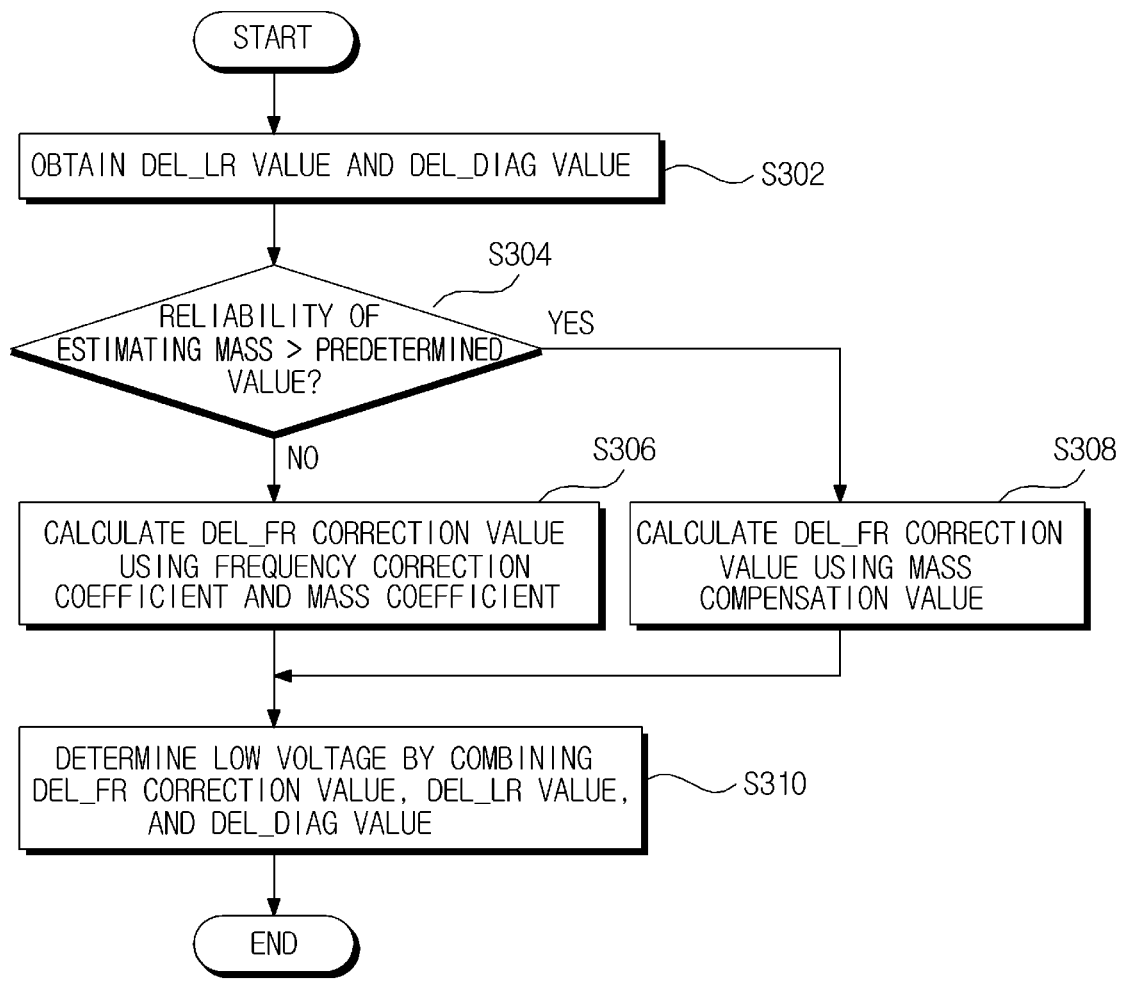
FIG. 3 is a detailed flow chart of a step of calculating a DEL_FR correction value in accordance with reliability of mass estimation of FIG. 2 according to an exemplary embodiment of the present invention.

FIG. 3 is a detailed flow chart of a step of calculating a DEL-FR correction value in accordance with reliability of mass estimation of FIG. 2 according to an exemplary embodiment of the present invention.

The calibration unit 140 obtains a left and right radius analysis value DEL_LR and a diagonal radius analysis value DEL_DIAG calculated in the radius analyzing unit 110 in step S302. Next, the calibration unit 140 transmits the left and right radius analysis value DEL_LR and a diagonal radius analysis value DEL_DIAG together with the front and rear radius analysis value DEL_FR calculated in the radius analyzing unit 110 to the low pressure determining unit 150.

The calibration unit 130 confirms whether the reliability of the added mass of the vehicle exceeds the predetermined value in step S304.

In contrast, a result of confirmation in step S304, when the reliability of the added mass of the vehicle does not exceed the predetermined value, that is, is equal to or smaller than the predetermined value, the calibration unit 130 corrects the front and rear radius analysis value DEL_FR using the calculated frequency correction coefficient and the mass coefficient in step S306. That is, when the reliability of the added mass of the vehicle is equal to or smaller than the predetermined value, the calibration unit 130 may correct the front and rear radius analysis value DEL_FR calculated in the radius analyzing unit 110 by subtracting a value obtained by multiplying the calculated frequency correction coefficient and the mass coefficient from the front and rear radius analysis value DEL_FR calculated in the radius analyzing unit 110.

In contrast, as a result of confirmation in step S304, when the reliability of the added mass of the vehicle exceeds the predetermined value, the calibration unit 130 corrects the front and rear radius analysis value DEL_FR using the calculated mass compensation value in step S308. That is, when the reliability of the added mass of the vehicle exceeds the predetermined value, the calibration unit 130 may correct the calculated front and rear radius analysis value DEL_FR by subtracting the mass compensation value calculated in the mass estimating unit 140 from the front and rear radius analysis value DEL_FR calculated in the radius analyzing unit 110.

Thereafter, the low pressure determining unit 150 may determine a low pressure of the tire by combining the left and right radius analysis value and a diagonal radius analysis value, among the radius analysis values calculated in the radius analyzing unit 110 and the front and rear radius analysis value corrected in the calibration unit 130 in step S310.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A tire pressure monitoring apparatus in a tire monitoring system (TPMS) for monitoring a low pressure of a tire mounted on a vehicle using a mass of the vehicle, the apparatus comprising:
   a wheel velocity sensor of wheels of the vehicle, wherein the wheel velocity sensor detects rotation velocities of each of the wheels of the vehicle;
   wherein the tire pressure monitoring apparatus is configured to calculate a radius analysis value using a relative velocity difference and an average velocity calculated from wheel velocities of the wheels mounted on the vehicle,
   to determine frequency data of each wheel and to determine a frequency low pressure probability for determining a low pressure of each wheel using the measured frequency data, wherein the frequency low pressure probability is a probability that the tire has low pressure assigned to the frequency data of each wheel, wherein the frequency data of each wheel is a resonance frequency data generated from the rotation velocities of each of the wheels of the vehicle,
   to estimate an added mass of the vehicle and to calculate a reliability of the estimated added mass of the vehicle, wherein the reliability of the estimated added mass of the vehicle is determined by Kalman filtering,
   to calculate a mass compensation value using a calculated added mass of the vehicle and a predetermined mass coefficient, to calculate a frequency correction coefficient using the frequency low pressure probability, and to correct the calculated radius analysis value using the mass compensation value and the frequency correction coefficient in accordance with the reliability of the added mass, wherein the frequency correction coefficient is calculated using a relative low pressure probability difference between front wheels and rear wheels of the vehicle and an average low pressure probability of each of the wheels of the vehicle, and
   to determine a low pressure of the tire mounted on the vehicle using the corrected radius analysis value.

2. The apparatus according to claim 1, wherein the tire pressure monitoring apparatus stores data related with radius analysis and frequency analysis used to determine the low pressure of the tire mounted on the vehicle and a predetermined mass coefficient for every tire of the vehicle.

3. The apparatus according to claim 1, wherein when the reliability of the added mass of the vehicle is calculated using a Kalman filter, the tire pressure monitoring apparatus calculates reliability of the calculated added mass of the vehicle using a covariance of the Kalman filter.

4. The apparatus according to claim 1, wherein the tire pressure monitoring apparatus calculates a mass compensation value by multiplying the predetermined mass coefficient and a value obtained by dividing a value which is obtained by subtracting a minimum mass from the added mass of the vehicle by a mass difference of a maximum mass and the minimum mass.

5. The apparatus according to claim 1, wherein the tire pressure monitoring apparatus calculates a relative low pressure probability between a front wheel and a rear wheel from a frequency low pressure probability for the low pressure for the vehicle and an average low pressure probability and calculates the frequency correction coefficient using the calculated relative low pressure probability and average low pressure probability.

6. The apparatus according to claim 1, wherein when the reliability of the added mass of the vehicle is equal to or smaller than a predetermined value, the tire pressure monitoring apparatus corrects a front and rear radius analysis value DEL_FR using the calculated frequency correction coefficient and the mass coefficient and when the reliability of the added mass of the vehicle exceeds the predetermined value, the tire pressure monitoring apparatus corrects the front and rear radius analysis value DEL_FR using the calculated mass compensation value.

7. The apparatus according to claim 6, wherein when the reliability of the added mass of the vehicle is equal to or smaller than the predetermined value, the tire pressure monitoring apparatus corrects the calculated front and rear radius analysis value DEL_FR by subtracting a value obtained by multiplying the calculated frequency correction coefficient and the mass coefficient from the calculated front and rear radius analysis value DEL_FR.

8. The apparatus according to claim 6, wherein when the reliability of the added mass of the vehicle exceeds the predetermined value, the tire pressure monitoring apparatus corrects the calculated front and rear radius analysis value DEL_FR by subtracting the calculated mass compensation value from the calculated front and rear radius analysis value DEL_FR.

9. The apparatus according to claim 6, wherein the tire pressure monitoring apparatus determines a low pressure of the tire by combining a left and right radius analysis value and a diagonal radius analysis value, among the radius analysis values calculated in the radius analyzing unit and the front and rear radius analysis value corrected in the calibration unit.

10. A tire pressure monitoring method for monitoring a low pressure of a tire mounted on a vehicle using a mass of the vehicle in a tire monitoring system (TPMS), the method comprising:
    detecting rotation velocities of each of wheels of the vehicle by a wheel velocity sensor of the wheels of the vehicle;
    calculating a radius analysis value using a relative velocity difference and an average velocity calculated from wheel velocities of the wheels mounted on the vehicle;
    measuring frequency data of each wheel and determining a frequency low pressure probability for determining a low pressure of each wheel using the measured frequency data, wherein the frequency low pressure probability is a probability that the tire has low pressure assigned to the frequency data of each wheel, wherein the frequency data of each wheel is a resonance frequency data generated from the rotation velocities of each of the wheels of the vehicle;
    estimating an added mass of the vehicle and calculating a reliability of the estimated added mass of the vehicle, wherein the reliability of the estimated added mass of the vehicle is determined by Kalman filtering;
    calculating a mass compensation value using a calculated added mass of the vehicle and a predetermined mass coefficient;
    calculating a frequency correction coefficient using the frequency low pressure probability, wherein the frequency correction coefficient is calculated using a relative low pressure probability difference between front wheels and rear wheels of the vehicle and an average low pressure probability of each of the wheels of the vehicle; and
    correcting the calculated radius analysis value using the mass compensation value and the frequency correction coefficient in accordance with the reliability of the added mass; and
    determining a low pressure of the tire mounted on the vehicle using the corrected radius analysis value.

11. The method according to claim 10, wherein in the calculating of reliability of the added mass, when the reliability of the added mass of the vehicle is calculated using a Kalman filter, the reliability of the calculated added mass of the vehicle is calculated using a covariance of the Kalman filter.

12. The method according to claim 10, wherein in the correcting of a radius analysis value, a mass compensation value is calculated by multiplying the predetermined mass coefficient and a value obtained by dividing a value which is obtained by subtracting a minimum mass from the added mass of the vehicle by a mass difference of a maximum mass and the minimum mass.

13. The method according to claim 10, wherein in the correcting of a radius analysis value, a relative low pressure probability and an average low pressure probability between a front wheel and a rear wheel are calculated from a frequency low pressure probability for the low pressure for the vehicle and a frequency correction coefficient is calculated using the calculated relative low pressure probability and average low pressure probability.

14. The method according to claim 10, wherein in the correcting of a radius analysis value, when the reliability of the added mass of the vehicle is equal to or smaller than a predetermined value, a front and rear radius analysis value DEL_FR is corrected using the calculated frequency correction coefficient and a mass coefficient and when the reliability of the added mass of the vehicle exceeds the predetermined value, the front and rear radius analysis value DEL_FR is corrected using the calculated mass compensation value.

15. The method according to claim 14, wherein in the correcting of a radius analysis value, when the reliability of the added mass of the vehicle is equal to or smaller than the predetermined value, the calculated front and rear radius analysis value DEL_FR is corrected by subtracting a value obtained by multiplying the calculated frequency correction coefficient and the mass coefficient from the calculated front and rear radius analysis value DEL_FR.

16. The method according to claim 14, wherein in the correcting of a radius analysis value, when the reliability of the added mass of the vehicle exceeds the predetermined value, the calculated front and rear radius analysis value DEL_FR is corrected by subtracting the calculated mass compensation value from the calculated front and rear radius analysis value DEL_FR.

17. The method according to claim 14, wherein in the determining of a low pressure of the tire, a low pressure of the tire is determined by combining a left and right radius analysis value and a diagonal radius analysis value, among the calculated radius analysis values and the corrected front and rear radius analysis value.

* * * * *